INVENTOR
Charles R. Ballantyne
Walter H. Sanderson
BY Watson, Cole, Grindle + Watson
ATTORNEY INVENTOR
Charles R. Ballantyne
Walter H. Sanderson
BY Watson, Cole, Grindle + Watson
ATTORNEY 3,041,148
CONTINUOUS BATCH COMPOSTING APPARATUS
Charles R. Ballantyne, Basking Ridge, and Walter H. Sanderson, Greenbrook Township, N.J., assignors to Komline-Sanderson Engineering Corporation, Peapack, N.J., a corporation of New Jersey
Filed Oct. 22, 1959, Ser. No. 848,039
2 Claims. (Cl. 23—259.1)

This invention relates to a composting or material-digesting apparatus for expediting the aerobic decomposition or composting of organic material, such as sewage sludge and/or garbage. It has heretofore been found that the treatment of sewage sludge by composting is desirable for the purpose of converting the esthetically objectionable sludge into a substantially odor-free and valuable soil-conditioning and fertilizing agent having commercial value. It has similarly been known to treat garbage in the same manner and for the same purpose. Such treatment has the advantage that garbage and sewage sludge may, if desired, be intermixed and treated simultaneously. Such a process is particularly attractive under present-day conditions, wherein the wide-spread use of home garbage disposal units connected with sewage systems has resulted in the sewage of many municipalities having comparatively high percentage of garbage content.

The apparatus of the present invention consists essentially of a multi-compartment drum rotating about a horizontal axis, with means for separately charging and discharging its several compartments and preferably also with means for injecting fluids such as air or gases and water or other liquids or mixtures individually into the respective compartments.

While the prior art contains examples of composting apparatus, these fall generally into two classes, in one of which the material to be treated is progressively and uniformly forwarded through a drum or hopper comprising but a single compartment, with the disadvantage that successive charges of material delivered into the said compartment may not be uniformly composted or digested due to varying ingredients and/or conditions. Thus it is difficult, in such apparatus, to maintain approximate uniformity of the resulting compost product. In the other class of such apparatus, provision is made for a multiple compartment drum or hopper in which the material is transferred successively from one compartment to the next adjoining compartment toward the discharge end of the unit. This type of unit is such that there is substantially the same disadvantage aforementioned, since the necessity for shifting or transferring the material in rapid succession from each compartment to the adjoining compartment will be readily apparent, in order that the intake compartment may be cleared for reception of a new batch of material. It will be readily seen, therefore, that this makes impossible the retention of material in different compartments for varying periods depending upon the stage and rate of decomposition of the individual batches of material.

It is, therefore, an important object of the invention to provide a composting apparatus of the rotating drum type subdivided into a plurality of composting compartments, each with its own charging and discharging opening, wherein the composted material is retained in each compartment throughout the entire composting process, and the period of retention of material in each compartment may be varied as desired in order to secure optimum results. It is a further object to provide separate closures for the respective compartments arranged to permit individual inspection of the contents, without disturbing the remaining compartments.

It is a further object to dispose such compartments around the drum in diametrically opposed pairs, together with drum rotating means capable of selectively bringing the drum to rest in a position wherein any predetermined pair of compartments in said position of rest will be positioned in a common vertical plane with the rotational axis of the drum, whereby their outwardly-directed closures may be opened to permit simultaneous charging and discharging by gravity of the respective uppermost and lowermost of the said compartments.

It is a feature of the invention to provide in conjunction with such a drum a charging means or element and a discharge conveyer located respectively above and below the drum in the common plane of said axis for charging and discharging the respective uppermost and lowermost compartments as aforesaid.

It is a further object and feature of the invention to provide a novel arrangement for conveying suitable liquids and/or gases into the respective compartments both during rotation of the drum and, if desired, when it is brought to rest.

For the purpose of illustrating a preferred exemplification of the invention, the present application includes a drawing, in which.

Figure 1:
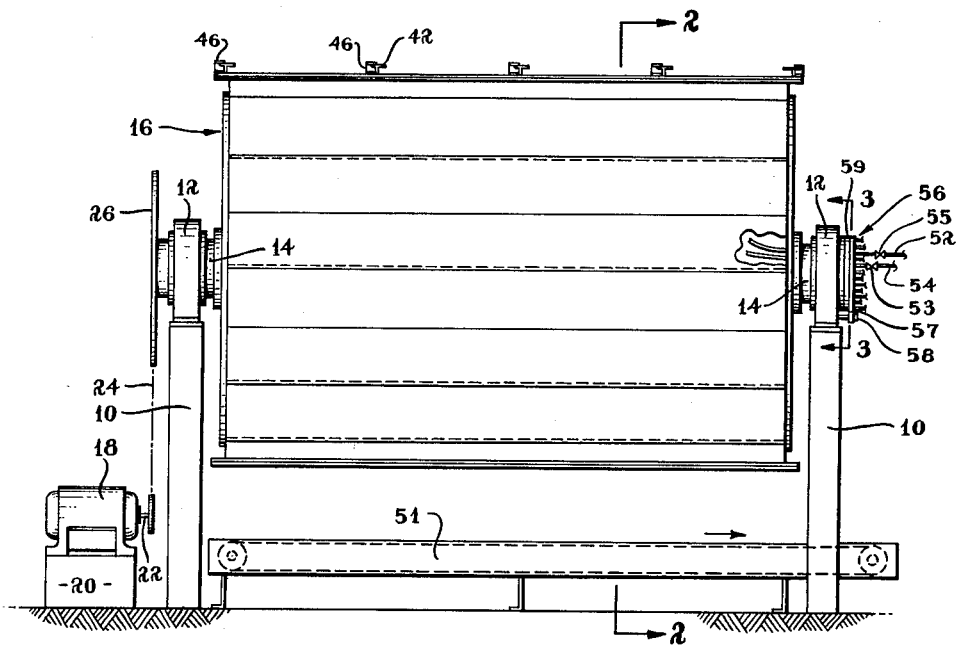
FIGURE 1 represents a side elevation of a rotary drum type continuous batch composting unit embodying the several novel features of the invention.

Referring now in detail to the accompanying drawings, the mechanism of the invention is supported on a suitable framework which, in the present application, is exemplified by the relatively spaced upright standards 10—10 of FIGURE 1, on the upper ends of which are fixed relatively spaced bearings 12—12. Supported for rotation in and between the respective bearings are relatively axially aligned hollow stub shafts 14—14 affixed to and rotatably supporting the drum or drum structure generally designated 16.

For the purpose of rotating of the said drum 16 about its stub shafts 14, there is provided a usual electric driving motor 18 mounted on a base 20 and having its output shaft 22 connected through a usual flexible drive 24 to a driven wheel 26 keyed or otherwise fixedly secured on one of the stub shafts 14. The motor 18 is provided with a usual switch or other control means for energizing it and for selectively bringing it to rest in any of various preselected rotational positions for the purposes more fully described hereinafter. The drum 16 is suitably subdivided into a plurality of individual composting compartments of similar size and shape, each designated by the reference character 28. All of said compartments extend with their major axes parallel to the rotational axis of the drum in the preferred embodiment of the invention and these are spaced uniformly radially from the rotational axis of the drum. It has been found both convenient and practical to provide the drum with a central coaxial portion or compartment 30 of regular polygonal cross-section, the polygon in this instance constituting a hexagon, around which the several composting compartments 28 are contiguously arranged. In the preferred embodiment, each of the composting compartments is of similar hexagonal configuration, with the inner side wall 32 of each shared in common with and constituting one of the boundary wall portions of the compartment 30. Also, with this arrangement, each adjoining pair of compartments 28 is separated by a common radial wall or partition 34.

The radially outwardly-directed portions of the respective drums or compartments 28 are formed to define charging and discharging openings, each designated 36. Associated with each such opening, for selectively and independently covering and uncovering such opening, is a closure 38, which in the present embodiment is hingedly connected at 40 to its respective compartment along one edge portion of the opening 36 thereof.

Any of a number of usual expedients may be employed for releasably securing each of the covers or closures 38 in closed position. In the present embodiment, we have utilized for this purpose a plurality of generally conventional pivoted latches 42, each pivotally secured to its respective compartment along one edge and to one side of the opening 36 thereof in such manner that it may be manually actuated to position its latching portion 44 in operative latching engagement with a latch plate 46 secured at the free edge portion of the closure 38.

Figure 2:
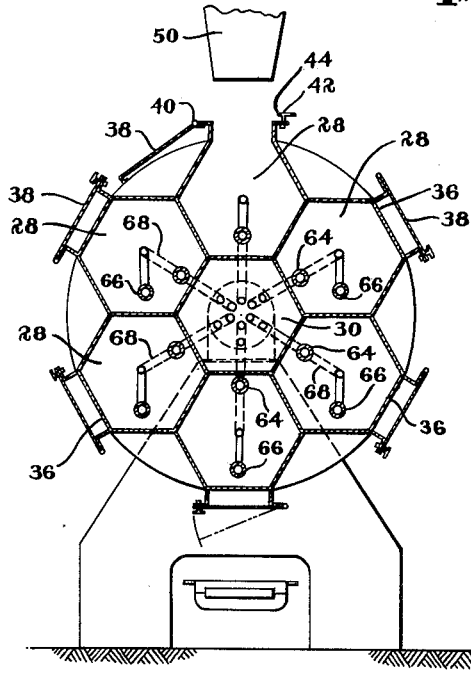
FIGURE 2 represents a cross-section on the line 2—2 of FIGURE 1.

For the purpose of individually charging the respective compartments 28 with material to be treated therein, there may be provided over the drum and in the axial plane thereof a charging spout or hopper which is shown in part only in FIGURE 2 and is designated by the reference character 50. While such a charging hopper or equivalent element is desirable, and in conjunction with the drum and discharge conveyer hereinafter described, constitutes a novel combination, it is by no means essential to the invention considered from its broader aspects.

The means for moving the discharged material from the drum is exemplified by the conventional belt-type or endless conveyer generally designated 51, disposed beneath the drum and in a common axial plane with both the rotational axis of the drum and with the charging hopper or chute 50, where such is provided. Inasmuch as the illustrated conveyer 51 merely exemplifies any of various forms of well-known conveyers and its specific structure is not a part of this invention, it will not be further described other than to point out that it will incorporate usual driving means not illustrated in the drawings.

It is well known, of course, that in composting apparatus, it is highly desirable to provide means for aerating the composted material both in order to maintain it at the desired temperature for promoting the bacterial or other reactions which occur, as well as for supplying into the material the air which is essential to the desired aerobic decomposition of the material. Similarly, it is desirable to provide such means for admitting liquid such as water with or without other ingredients for promoting the desired reactions and for maintaining the desired consistency of the material.

In order to accomplish these ends, suitable means is provided. Such liquids and/or air or other gases may accordingly be supplied through the liquid conduits 52 under the control of their respective valves 53 and through the air or gas conduits 54 under the control of their respective valves 55. These conduits 52 and 54 all deliver to a distributor head or manifold designated in its entirety by the reference character 56. In its preferred embodiment, this distributor head comprises a first plate or portion 57 fixedly secured at the end of stub shaft 14 and held against rotation with said shaft by means such as the bolt 58 interconnecting it to the bearing structure 12. In addition to this stationary portion 58, the distributor head comprises a rotary portion in the form of a circular plate 59 fixed on the end of stub shaft 14 for rotation therewith. These plates or portions 57 and 59 respectively have adjoining faces in snug fluid-tight rubbing engagement, and defined between them are a pair of relatively concentric arcuate fluid channels arranged in angular positions about the drum axis corresponding to the angular positions of the respective compartments 28. These are exemplified as channels or grooves 60 and 62 formed in the abutting or engaging face of the rotary plate 59.

The annularly arranged liquid conduits 52 extend through the stationary plate 57 for communication with the channels 62 and the air conduits 54 similarly extend through the stationary plate 57 for communication with the distribution channels 60. Disposed in each compartment 28 is a liquid distributing head 64 and an air or gas distributing head 66. Preferably, though not necessarily, these distributing heads comprise multi-perforated pipes extending extending longitudinally or, in other words, in an axial direction, throughout the entire length of each compartment 28 to thereby effectively distribute the liquids and/or air or other gas, which is supplied to each of these distributors in each compartment by suitable conduit means. As will be seen in FIGURES 2 and 4, such means comprises an air delivery pipe or conduit 68 extending through the rotary plate 59 and the inner wall 32 of its associated compartment 28 to establish communication between each distribution groove 60 and its respective distributor head 66. Similarly, a conduit 70 establishes communication between each water distributor head 64 and its respective distributing channel 62 within the manifold 56. The reason for arcuately extending the channels 60 and 62 is merely to facilitate their being brought to rest in registry with the adjoining ends of pipes 54 and 52 respectively, this being made possible by the uniform angular spacing of the respective pipes and channels. When thus positioned, water and/or air may be selectively supplied to any one or more of the compartments 28 through control of the valves 53 and 55.

Figure 4:
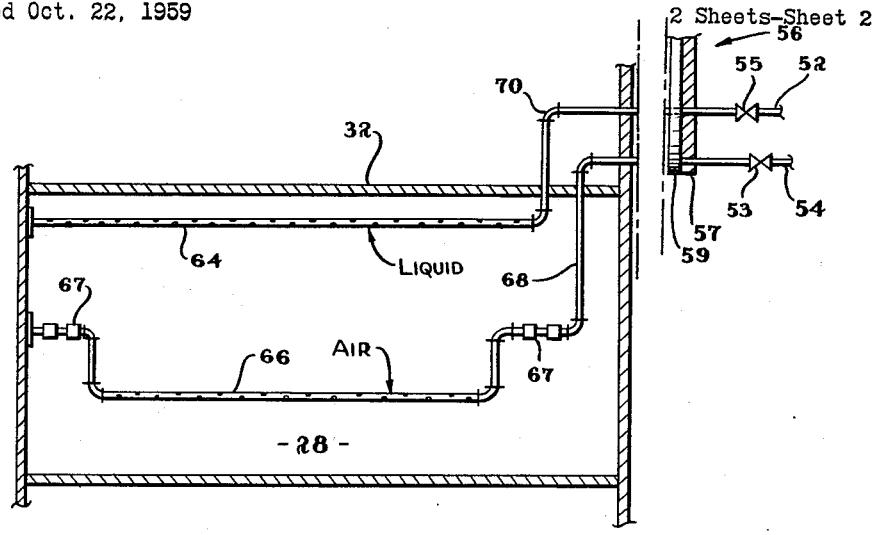
FIGURE 4 represents a generally diagrammatic sectional view (with certain portions broken away) in an axial plane through one of the composting compartments.
Figure 3:
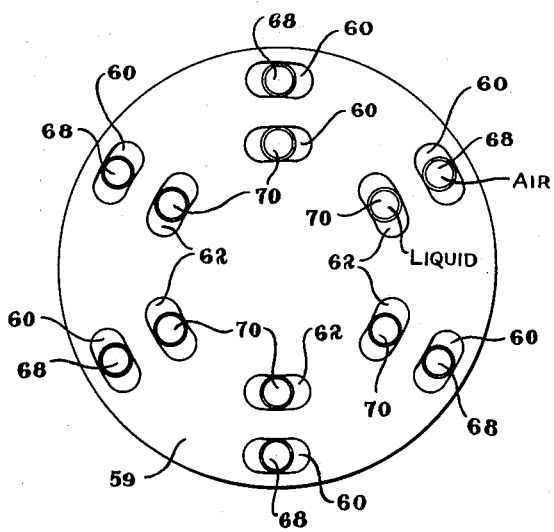
FIGURE 3 represents a somewhat enlarged detailed sectional view showing the interior structure of the liquid and gas distributor head or manifold, same being taken on line 3—3 of FIGURE 1.

Referring to FIGURE 4, each water distributing head 64 is fixedly positioned within its compartments 28, it will be apparent that even though this head 64, due to rotation of the drum 16, will at times be immersed in the treated material and will at other times be partially or wholly withdrawn therefrom. Despite this, however, the rotation of the drum and the constant tumbling of the treated material will tend to effectively intermix the water with the material. In the case of the air distributing head 66, however, it is obviously desirable to maintain same embedded or immersed in the material at all times, to thus discharge air or gas directly into the material. To this end, the head 64 is supported from axially aligned swing joints 67, in radially offset relation to the common axis of said joints, whereby it will rotate by gravity about the axis of said joint incident to rotation of the drum. Thus, it will be positioned at all times generally above and adjacent the lowermost side of its respective compartments, and normally beneath the surface of the constantly tumbling material being treated within the compartment.

In the operation of the invention above described, it will be apparent that sludge or garbage to be treated, or a mixture of the two, will normally be delivered through the chute or hopper 50 into the respective compartments 28, the drum being intermittently rotated and brought to rest with each compartment in an upwardly presented position beneath the hopper 50 for this purpose. After each such compartment has been supplied with the desired amount of material to be treated, its previously opened closure 38 will be then brought to closed position and secured therein by the latch means 42 and the drum will then be rotated by the motor 18 to bring another compartment 28 into proper position for charging. When all or any desired number of the compartments are charged with material, the motor 18 is energized to continuously rotate the drum 16 in order to cause a continuous tumbling and agitation of the material contained within these compartments. Such tumbling will obviously result in a tendency to subdivide the material progressively into comparatively small particles and also will tend to expose the material to contact with the air within each compartment to facilitate the action of the aerobic bacteria.

It will, moreover, be seen that in the preferred embodiment herein illustrated, wherein the compartments are of hexagonal or other polygonal cross-section, the aforesaid tumbling action will be increased due to the tendency of the material to tumble from one flat side to the next of its respective compartment. It will be appreciated, of course, that the respective compartments are not charged to capacity with material, but rather, sufficient empty space is left within each compartment to permit a substantial degree of such tumbling action. It will be readily apparent that air or other gases, if desired, may be selectively admitted through conduit 54, the manifold 56, conduits 68 and distributor heads 66, into the respective compartments 28. Similarly, water or other liquids may be admitted as desired through the conduit 52, distributor manifold 56, conduits 70 and the distributor heads 64, into the respective compartments 28.

In the utilization of the invention, it will be appreciated that the air or other gases serve the functions of controlling the temperatures in the respective compartments, as well as of promoting the bacterial action. Obviously, suitable temperature-measuring and indicating instruments, not constituting part of this invention, may be associated with the respective compartments 28. Because of the independent arrangement of the respective compartments, the contents of any compartment may be inspected merely through bringing the drum to rest and opening the closure 38 of the particular compartment. The contents of each compartment may be retained therein and treated for whatever time may be required to properly conclude its treatment, without regard to the length of treatment of material in other compartments. It is to be presumed, however, that in most instances the duration of treatment of material in the respective compartments will be generally uniform. In such cases, the relatively diametrically opposed arrangement of the respective compartments and the closures 38, together with the disposition of the charging element 50 and the discharging conveyer 51 is such as will facilitate the rapid charging and discharging of the drum. In this connection, it will be readily apparent that when any diametrically opposed pair of compartments 28 is to be charged and/or discharged, they may be brought to rest in the common vertical plane of the element 50 and the conveyer 51, and in such position of rest, the uppermost compartment 28, if previously discharged, may be supplied with a fresh charge of material for treatment, while the lowermost compartment is simultaneously discharging its contents into the conveyer 51.

In this application, we have shown and described only the preferred embodiment of our invention. However, we are cognizant that our invention is capable of other and different embodiments and that its several details may be modified in various ways, all without departing from our primary inventive concept as expressed in the accompanying claims. Accordingly, the drawings and description herein are to be construed merely as illustrative in nature and not as restrictive.

Having thus described our invention, we claim:

1. A continuous batch composting unit comprising a supporting frame, a hollow drum supported in said frame for rotation about a horizontal axis, said drum comprising a plurality of annularly arranged composting compartments disposed about said axis in relatively diametrically opposed pairs, each said compartment being formed with a radially outwardly directed charging and discharging opening, a closure removably associated with said opening for selectively covering and uncovering same, each compartment when closed by its said closure being completely isolated from other compartments to prevent intermingling of the contents of the several compartments, each said compartment having a major axis extending parallel to the said horizontal axis, and being of uniform cross sectional shape with the walls thereof uniformly spaced from said major axis, a material-charging element and a discharging conveyer disposed respectively above and below said drum in a common vertical plane with the axis thereof, whereby the drum may be brought to rest with diametrically opposed compartments thereof in said common vertical plane to permit simultaneous charging and discharging of material to and from said compartments, and fluid supplying means in each said compartment, each said means comprising a fluid distributing head, swing joints supporting said head in its respective compartment below the major axis thereof for rotary movement about said axis under the combined influence of gravity and the rotation of said drum about its horizontal axis.

2. A continuous batch composting unit comprising a supporting frame, a hollow drum supported in said frame for rotation about a horizontal axis, means for rotating said drum about its said axis, said drum comprising a plurality of separate composting compartments completely isolated from each other and disposed about said axis, each said compartment being formed with a radially outwardly directed charging and discharging opening, a closure removably associated with said opening for selectively covering and uncovering same, a material charging element and a discharging conveyer disposed respectively above and below said drum in a common vertical plane with the axis thereof, and means for supplying fluids into the respective compartments during rotation of said drum, each said compartment having a major axis extending parallel to the said horizontal axis and being of uniform cross sectional shape, said fluid supplying means comprising in each compartment a fluid distributing head, a swing joint supporting said head below the said major axis of its said respective compartment for rotary movement with the said major axis under the combined influence of gravity and the rotation of said drum about its horizontal axis.

References Cited in the file of this patent

UNITED STATES PATENTS

| | | |
|---|---|---|
| 388,606 | Welpton | Aug. 29, 1888 |
| 621,563 | Gilbert | Mar. 21, 1899 |
| 1,144,272 | West | June 22, 1915 |
| 2,094,749 | Rabassa | Oct. 5, 1937 |
| 2,660,809 | Morrison | Dec. 1, 1953 |